United States Patent [19]

Sakakihara

[11] Patent Number: 5,222,117
[45] Date of Patent: Jun. 22, 1993

[54] X-RAY RADIOGRAPH APPARATUS

[75] Inventor: Hisashi Sakakihara, Ootawara, Japan

[73] Assignee: Kabushiki Kaisha Toshiba, Kawasaki, Japan

[21] Appl. No.: 787,106

[22] Filed: Nov. 4, 1991

[30] Foreign Application Priority Data

Nov. 6, 1990 [JP] Japan .................................. 2-300192

[51] Int. Cl.$^5$ .............................................. G03B 42/04
[52] U.S. Cl. .................................... 378/173; 378/174; 378/207
[58] Field of Search ............... 378/167, 173, 174, 181, 378/182, 187, 207; 340/722, 753, 754

[56] References Cited

U.S. PATENT DOCUMENTS

| 4,197,650 | 4/1980 | Bailey et al. | 340/754 |
| 4,504,851 | 3/1985 | Janko et al. | 358/139 |
| 4,796,285 | 1/1989 | Sakakihara et al. | 378/174 |
| 4,812,744 | 3/1989 | Havel | 340/754 |
| 4,922,239 | 5/1990 | Kugo et al. | 340/753 |

FOREIGN PATENT DOCUMENTS

| 0159639 | 12/1981 | Japan | 378/174 |
| 0167137 | 12/1981 | Japan | 378/174 |
| 0030533 | 2/1984 | Japan | 378/174 |

OTHER PUBLICATIONS

Pizzicara, Donald J., "Electroluminescence: An Appraisal for Avionic Display Applications"; *Information Display*, Mar./Apr. 1966, pp. 26–36.
Sony Audio, "Eye Fidelity", *Stereo Review*, Jun. 1979.

*Primary Examiner*—David P. Porta
*Attorney, Agent, or Firm*—Oblon, Spivak, McClelland, Maier & Neustadt

[57] ABSTRACT

An X-ray radiograph apparatus comprises means for detecting a number of remaining unphotographed recording media retained in a recording-medium feed magazine, and display means for displaying the number of remaining unphotographed recording media detected by the detecting means with scales which change logarithmically and multiple display elements arranged in association with the scales.

11 Claims, 4 Drawing Sheets

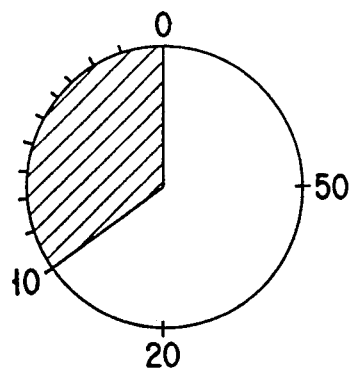
F I G. 7
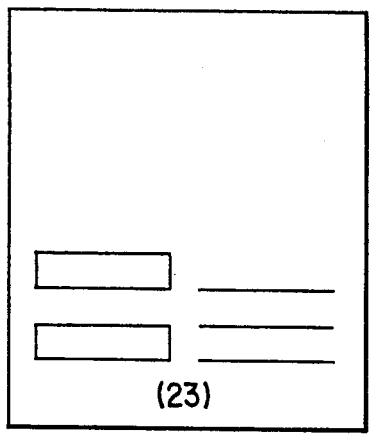
F I G. 8
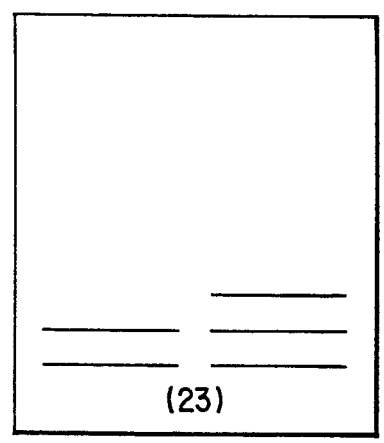
F I G. 9
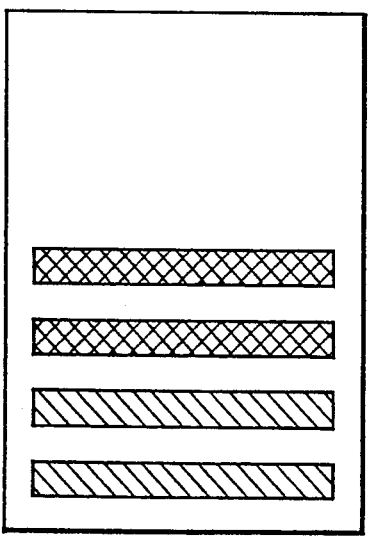
F I G. 10

X-RAY RADIOGRAPH APPARATUS

BACKGROUND OF THE INVENTION

1. Field of the Invention

The present invention relates to an X-ray radiograph apparatus which displays the number of remaining unused X-ray sheet films in the form of a bar graph.

2. Description of the Related Art

To improve the safety in X-ray radiograph, it is important to shorten the X-ray radiation period as well as to make the operation accurate.

According to conventional X-ray radiograph apparatuses, particularly, cassetteless X-ray radiograph apparatuses provided with a film feed magazine, it is necessary to inform an operator of the number of remaining unused sheet films retained in the magazine. Examples of such informing means are as follows.

The first means is to inform the operator of the number of remaining unused sheet films by displaying a "numeral." The displayed "numeral" becomes smaller by "1" every time one sheet film is used. If there are plural sizes of the magazines, i.e., plural sizes of the sheet films, plural numeral display sections are provided for each size.

The second means is to inform the operator by displaying a "bar graph." This "bar graph" display is made in such a way that multiple bars which can be lit and turned off are provided, each corresponding to a rough number of remaining unused sheet films, e.g., ten, these bars are turned off one by one every time ten sheet films are used.

According to the first conventional method which employs the "numeral" display to inform the operator of the number of remaining unused sheet films, it is difficult for the operator to quickly perceive the number of remaining unused sheet films. This is because the human perceives the volume based on a logarithmic manner. When there are different sizes of the sheet films, it becomes harder to quickly perceive the number of remaining unused sheet films by means of the numeral.

Further, since the number of the films initially set in the magazine are unknown or it is troublesome for the operator to count the initial number of the films set in the magazine, a conventional film detector detects the number of the unused films based on a total thickness of the remaining unused sheet films contained in the magazine and the thickness of one sheet film which is known. Therefore, if a slight amount of air is normally present between the sheet films, this affects the detector to detect the exact number of remaining films. If the total height of the air present between the sheet films is larger than the thickness of the film, the detector erroneously counts the number of the films. Thus, it is difficult to detect the accurate number of the films and is unnecessary to precisely display the number of the films if the number is large.

According to the second conventional method employing the "bar graph" display to inform the operator of the number of remaining unused sheet films, when the remaining number becomes smaller than the rough number indicated by the bar, the operator cannot know the accurate number of remaining unused sheet films.

The shortcomings of the conventional means for informing the operator of the number of remaining unused sheet films affect the radiograph operation as follows.

As it is difficult to perceive the proper timing for replacement of the film feed magazine in order to supplement sheet films, unused sheet films are likely to run out during a radiograph of a patient, thus requiring the supplement of unused sheet films during the radiation period of the X-ray. This inevitably makes the radiation period of the X-ray longer due to the supplementing action. This is critical to the human body particularly in the case a contrast medium is injected in the human under examination. In other words, when the supplement of unused sheet films is conducted after injection of a contrast medium, the contrast medium would flow out from the region of interest during this supplementing action, and additional contrast medium should be injected. Further, to check that the contrast medium has reached the region of interest, radiation of the X-ray should be performed again, thus increasing the amount of X-ray radiated to the human under examination.

SUMMARY OF THE INVENTION

It is therefore an object of the present invention to provide an X-ray radiograph apparatus which permits an operator to quickly determine whether or not the number of remaining unused sheet films is sufficient for the remaining number of X-ray shots, thereby shortening the radiation period of the X-ray and making the operation more accurate as well as improving the safety of the operation.

To overcome the aforementioned problems, according to the present invention, an X-ray radiograph apparatus comprises means for detecting a number of remaining unphotographed recording media contained in a recording-medium feed magazine, and means for displaying the number of remaining unphotographed recording media detected by said detecting means with a logarithmic scale.

According to the present invention, an operator can quickly understand whether or not sufficient unused sheet films are present, by checking the display data which is logarithmically changed in accordance with the number of the unused films.

Accordingly, the operator can replace the film feed magazine with a new one or supplement unused sheet films whenever appropriate and can finish radiation of the X-ray without making the supplementing action during radiograph.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 7 shows a display according to a modification of the first and second embodiment in which the bar graph is replaced with a pie chart;

FIG. 8 shows a display according to modification a of the first and second embodiment in which numerical display is added to the bar graph display;

FIG. 9 shows a display according to a further modification of the modification of FIG. 8 in which all the bars corresponding to the different numbers have the same figure; and FIG. 10 shows a display according to a further modification of the first and second embodiment in which the respective bars corresponding to the different numbers have different colors and luminance.

DETAILED DESCRIPTION OF THE PREFERRED EMBODIMENTS

Figure 1:
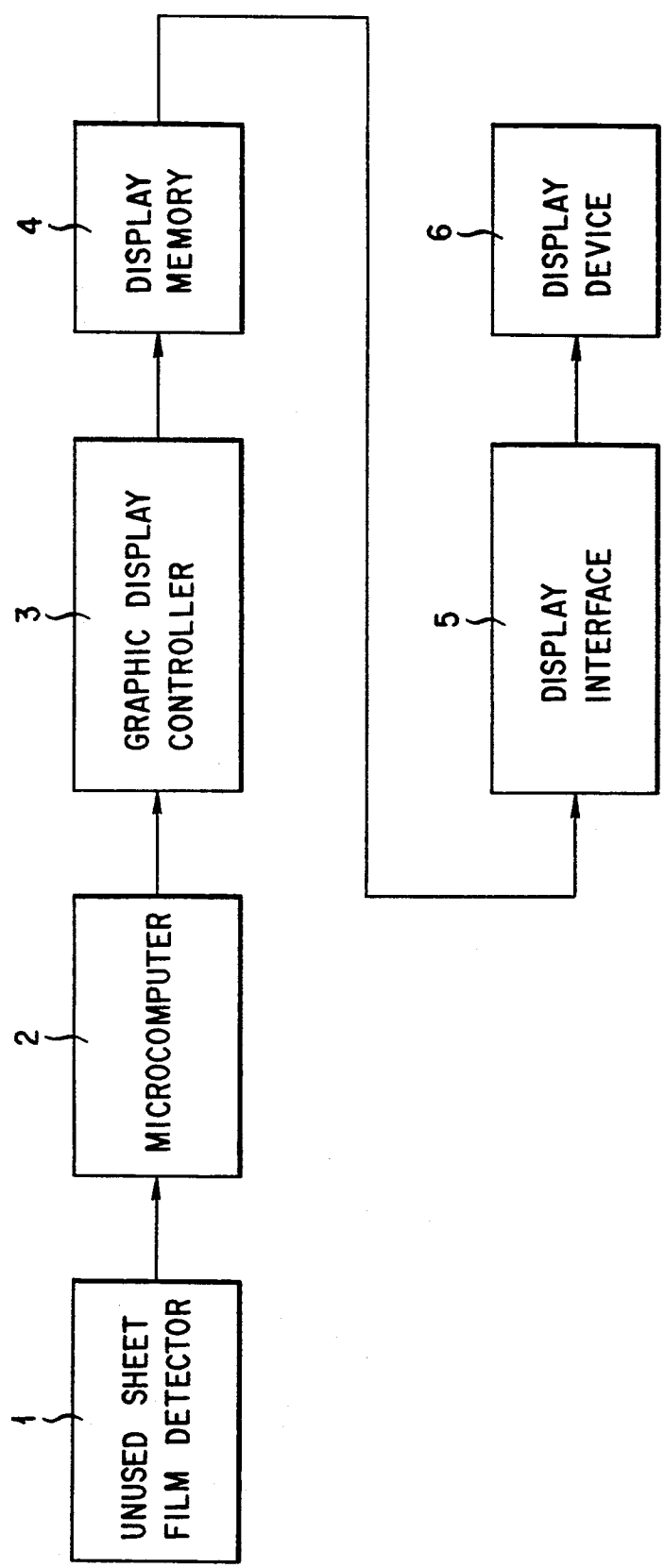
FIG. 1 is a block diagram illustrating the structure of a first embodiment of the X-ray radiograph apparatus according to the present invention.

One preferred embodiment of the present invention will now be described referring to FIG. 1. An unused sheet film detector 1 detects the number of unused sheet films retained in a film feed magazine of an X-ray radiograph apparatus (not shown), and outputs data for the detected number of unused sheet films.

The unused sheet film detector 1 may be a counter which processes a pulse signal from a rotary encoder which detects the up-and-down movement of a film adsorbing cylinder that feeds the unused sheet film from the film feed magazine one after another to a radiograph section. The count of the counter is initially set at the number of the sheet films contained in the magazine and is decreased by one as each film is fed out, i.e., upon every turn of the film adsorbing cylinder. Alternatively, the detector 1 may be a counter which decrements the initial number of unused sheet films retained in accordance with an X-ray radiation command from an X-ray controller. Further, the unused sheet film detector 1 may be designed to read the total thickness of the remaining unused sheet films contained in the magazine, so that based on that total thickness and the thickness of one sheet film which is previously obtained, the detector 1 calculates the exact number of the remaining sheet films. In this case, however, a slight amount of air is normally present between the sheet films, and this affects the detector 1 to detect the exact number of remaining films based on the total sheet thickness. If there are only a few sheet films remaining, for example, less than ten, the exact number of unused sheet films can be detected since the influence of the air can be disregarded. On the other hand, if many unused sheet films are present, the air influence has to be considered. However, according to the present invention, a bar indicating the "rough number" is displayed when there are many unused sheet films remaining, so as to allow for the difference between the exact number and the displayed number.

A microcomputer 2 accepts data of the number of unused sheet films from the unused sheet film detector 1. The microcomputer 2 converts that data into picturing data to instruct ON/OFF of a bar (display segment) according to the number of the unused sheet films, and outputs the picturing data.

A graphic display controller 3 has a graphic function to provide a bar graph formed of various kinds of bars. The graphic display controller 3 receives the picturing data from the microcomputer 2 and selectively lights on the bars in accordance with the picturing data.

A display memory 4 temporarily holds an output from the graphic display controller 3. A display interface 5 transmits an output from the display memory 4 as a display signal to a display device 6.

The display device 6 having multiple kinds of bars, four kinds in this case, is controlled by a display program of the microcomputer 2 to light on those bars corresponding to the number of remaining unused sheet films.

Figure 2:
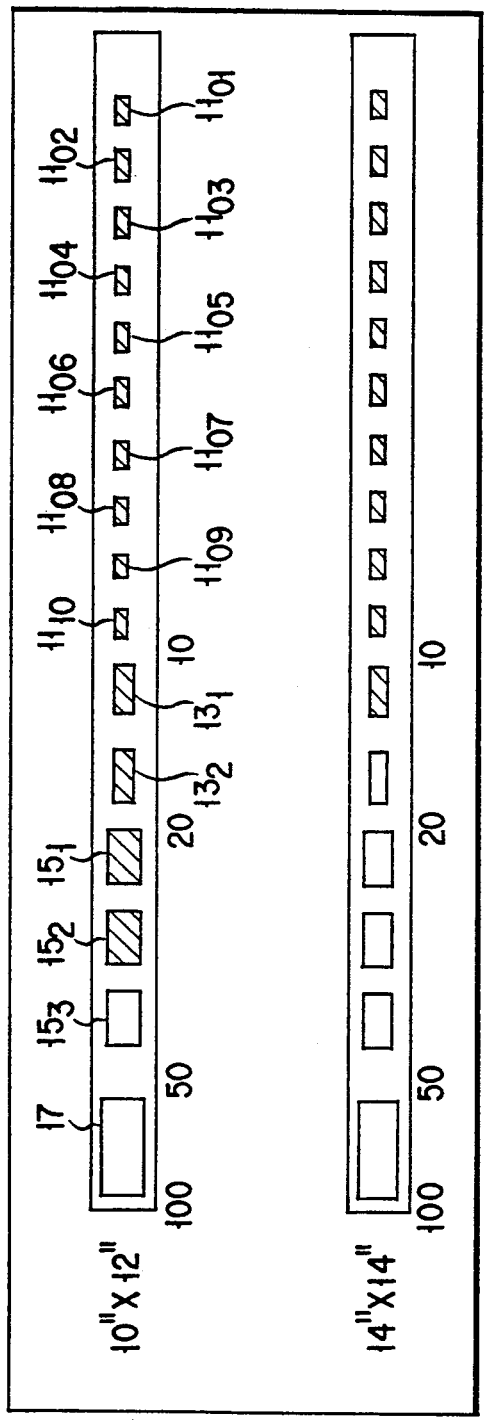
FIG. 2 is a diagram illustrating the arrangement of a bar graph used in the first embodiment.

FIG. 2 shows one example of the bar graph in the display device 6. Bars $11_{01}$ to $11_{10}$, $13_1$ and $13_2$, $15_1$ to $15_3$, and 17 correspond respectively to 1 sheet films, 5 sheet films, 10 sheet films and 50 sheet films. The shape or size of the bar graph changes in accordance with the corresponding number of sheets. In this embodiment, the length of bars increases in accordance with the increase of the corresponding number of sheet films, and the height of the bars increases as the number of corresponding sheet films increases. Therefore, scale attached to the bar graph is a logarithmic scale in which the interval of the graduations changed logarithmically. The logarithmic graduations are provided for denoting the 10, 20, 50, and 100 unused sheet films. The graduations are marked so as to gradually set a narrower interval between two adjacent graduations in a way that an interval between the graduations "20" and "50" is narrower than that between the graduations "10" and "20." These graduations help recognition of the remaining number of films indicated by lighting the bars.

10"×12" and 14"×14" show that the film feed magazines used are for a 10"×12" film (full size) and a 14"×14" film (quarter size), respectively.

The operation of the thus structured apparatus of this embodiment will now be explained. Since a typical loading magazine can retain 100 sheet films at the maximum, the X-ray radiograph apparatus in this embodiment can display a maximum of 100 sheet films according to the maximum retained sheet films.

As shown in FIG. 2, the bars $11_{01}$ to $11_{10}$, $13_1$ and $13_2$, and $15_1$ and $15_2$ for the 10"×12" film are to be lit on in the initial state. This lighting state shows that the remaining number of the unused sheet films are equal to or larger than 31 and equal to or less than 40.

Figure 3:
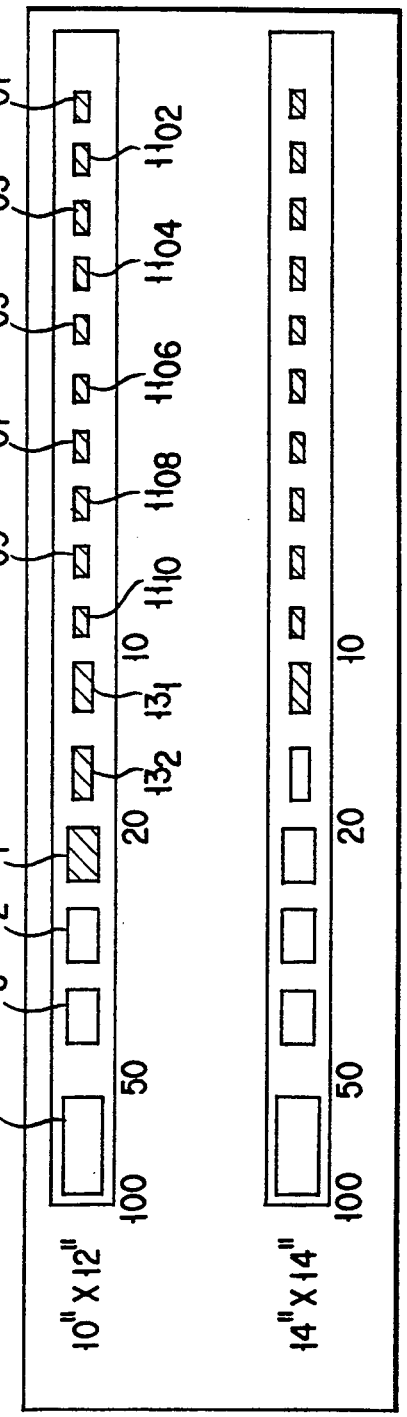
FIG. 3 is a diagram showing the change in the display of the bar graph of FIG. 2 in response to the decrease of the number of the remaining unused sheet films.

As X-ray radiograph progresses, the unused sheet film of 10"×12" retained in the magazine are fed out one after another, and the remaining number decreases accordingly. When the number of unused sheet films becomes 30 or below, the bar $15_2$ is turned off as shown in FIG. 3, leaving the bars $11_{01}$ to $11_{10}$, $13_1$ to $13_3$ and $15_1$ lit on at this time. The bars $15_1$ to $15_3$ represent the remaining number of sheet films by ten. Likewise, the bar 17 represents the sheet films by the unit of 100, and the bars $13_1$ and $13_2$ shows the films by the unit of 5. It will be therefore possible for the operator to quickly recognize whether a sufficient number of sheet films are remaining, by checking the lighting status of the bars.

Figure 4:
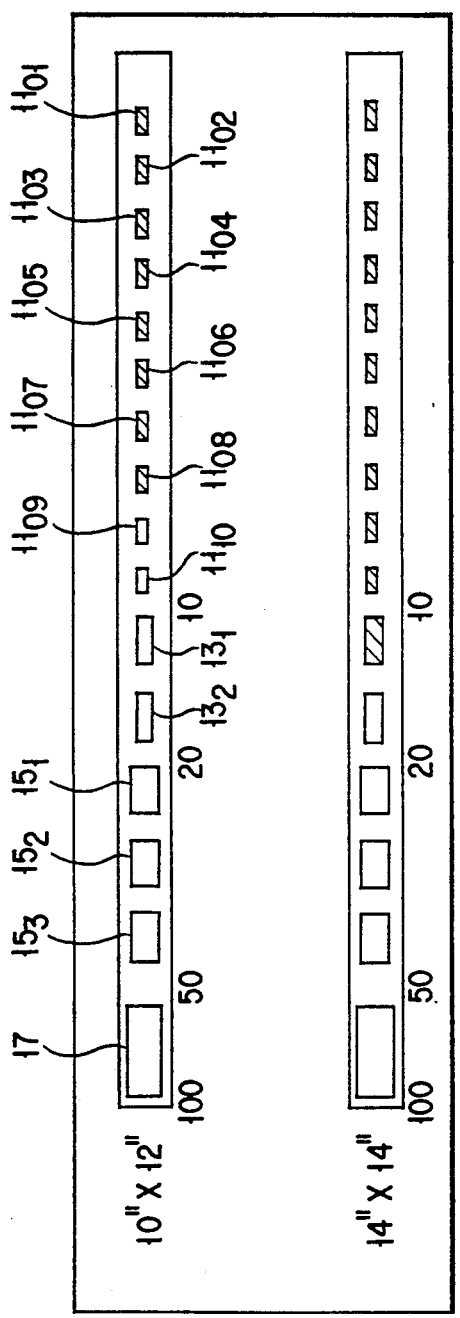
FIG. 4 is a diagram showing the variation in the bar graph of FIG. 2 in response to a further decrease of the number of the remaining unused sheet films.

FIG. 4 shows the lighting status of the bars in the case where X-ray radiograph has progressed and all the 10"×12" films are used. The lighting bars are only $11_{01}$ to $11_{08}$ in this case. Since the bars $11_{01}$ to $11_{10}$ represent the number of the sheet films by the unit of one, the status shown in FIG. 3 means that the number of unused sheet films is eight. When there are ten unused sheet films, only the bars $11_{01}$ to $11_{10}$ are lit on. As the sheet films are used one after another, these bars are turned off one by one, starting with the bar $11_{10}$ and ending at the bar $11_{01}$ accordingly. As described above, when the unused sheet films become few, ten or fewer in this case, the number of lighting bars in the bars $11_{01}$ to 10 informs the exact number of the films. The display of the number of the unused 14"×14" sheet films can be the same as in the former case. In the above description, all the bars are displayed in the same color. However, the display colors of the bars may be changed, such as red for the bars $11_{01}$ to $11_{10}$, yellow for the bars $13_1$ and $13_2$, green for the bars $15_1$ to $15_3$ and blue for the bar 17.

Though the first embodiment displays the bar graph along the horizontal direction, the bar graph can be displayed along the vertical direction. In the latter, all the bars have the same width but the height thereof changes in accordance with the number of sheets which is represented by the bar.

Figure 5:
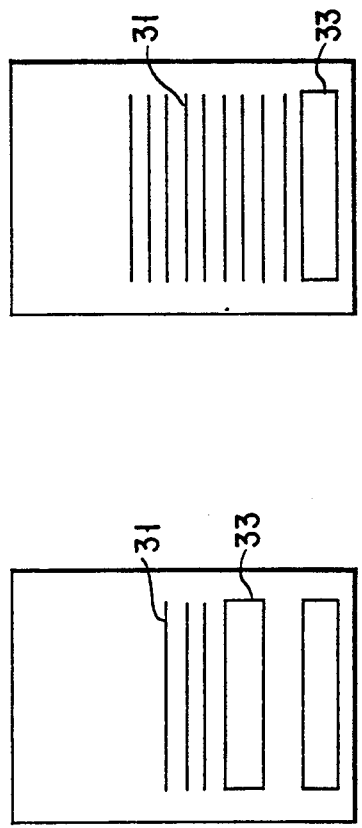
FIG. 5 illustrates a display device according to a second embodiment of the present invention.
Figure 6:
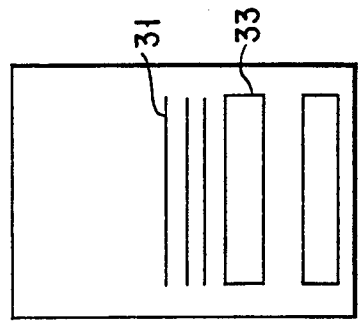
FIG. 6 shows the variation in the display of the display device shown in FIG. 5 in response to the decrease of the number of the remaining unused sheet films.

A second embodiment will now be described. The structure of the second embodiment is the same as that of the first embodiment, except for the display device, so that discussion of the structure will not be given below. FIGS. 5 and 6 illustrate a display device to be used in the second embodiment. This display device is a graphic display device in which the position and shape of each display element can be changed, such as a liquid crystal display device having plural bars with different shapes. In the first embodiment, the position and shape of each display elements cannot be changed. Display bars 31 and 33 indicate the number of unused films by the units of 1 and 10, respectively. The displaying status in FIG. 5 shows that 23 sheet films are unused, while the status in FIG. 6 shows that 19 unused sheet films are left. Although there are two kinds of bars used in this embodiment, three or more kinds of bars may be provided as in the first embodiment. The display bars 31 and 33 are to be displayed in association with the number of unused sheet films as per the first embodiment. In this embodiment, however, only the minimum number of bars according to the number of the unused sheet films are displayed.

The second embodiment can produce the same effect as obtained by the first embodiment. Further, since only the minimum number of bars are lit, mistaking turned-off bars as lighting bars which may occur in the first embodiment can be prevented.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, a method employing a pie chart as shown in FIG. 7 may be used, or the method of displaying the remaining number with bars and the method of displaying the remaining number by a "numeral" as shown respectively in FIGS. 8 and 9 may be used together. Alternatively, bars may be set in equal size as shown in FIG. 10, and display hues can be altered or the luminance of the single hue may be varied to change the units for the remaining number which the individual displays have. While the units for what the remaining number of the individual bars represent are determined in advance in the above-described embodiments, the units may be determined as desired in accordance with the various situations of the X-ray radiograph. In this case, a switch for inputting the units for the remaining number represented by each type of the bar has only to be connected to the microcomputer 2. Furthermore, it is possible that the operator can arbitrarily set the numbers of unused sheet films which are specified by the associated bars in the above embodiments except for those corresponding to one unused sheet film, i.e., the bars $13_1$, $13_2$, $15_1$ to $15_3$ and 17 in the first embodiment.

Further, the application of the present invention is not limited to a cassetteless X-ray radiograph apparatus using an X-ray film, but the present invention may be applied to an apparatus which loads multiple recording sheets of another type, such as storage-type fluophor plates or imaging plates. In the above embodiments, the number of the remaining films is indicated by means of a display element. However, it is possible to indicate the number of the remaining films by means of a mechanical indicator, such as a meter.

What is claimed is:

1. An X-ray radiograph apparatus comprising:
   means for detecting the total thickness of unphotographed sheet films stacked in a feed magazine;
   means for calculating the number of unphotographed sheet films on the basis of said total thickness detected by said detection means and a known thickness of a sheet film; and
   display means for displaying the number of said unphotographed sheet films calculated by said calculation means, said display means comprising a plurality of first display elements, at least one second display element, and at least one third display element, wherein each of said first display elements corresponds to a sheet film, said second display element corresponds to a first plurality of sheet films, and said third display element corresponds to a second plurality of sheet films which exceeds a number of the first plurality of sheet films corresponding to said second display element; and
   control means for controlling said display means such that, when said number of unphotographed sheet films is equal to or less than the number of said first display elements provided by said display means, the number of said first display elements coinciding with the number of said unphotographed sheet films are turned on, and when said number of unphotographed sheet films exceeds the number of said first display elements, said second display element is turned on, and further, when said number of unphotographed sheet films exceeds the total of the number of said first display elements and the number of sheet films corresponding to said second display element, said third display element is turned on.

2. An X-ray radiograph apparatus according to claim 1, wherein, when said number of unphotographed sheet films exceeds the number of said first display elements, said control means turns on all of said first display elements, together with said second display element.

3. An X-ray radiograph apparatus according to claim 2, wherein, when said number of unphotographed sheet films exceeds the total of the number of said first display elements and the number of sheet films corresponding to said second display element, said control means turns on all of said first display elements and said second display element, together with said third display element.

4. An X-ray radiograph apparatus according to claim 1, wherein said display means has a plurality of second display elements, and when said number of unphotographed sheet films exceeds the number of said first display elements, said control means selectively turns on a selected portion of said plurality of second display elements in accordance with said number of unphotographed sheet films.

5. An X-ray radiograph apparatus according to claim 1, wherein said display means has a plurality of third display elements, and when said number of unphotographed sheet films exceeds the number of said first display elements and the number of sheet films corresponding to said second display element, said control means selectively turns on a portion of said plurality of third display elements in accordance with said number of unphotographed sheet films.

6. An X-ray radiograph apparatus according to claim 1, wherein said second display element corresponds to five sheet films, and said third display element corresponds to a number of sheet films exceeding five sheet films.

7. An X-ray radiograph apparatus according to claim 6, wherein said third display element corresponds to ten sheet films.

8. An X-ray apparatus according to claim 1, wherein said display means further comprises a fourth display element, and when said number of unphotographed sheet films exceeds the total of the number of said first display elements, the number of sheet films corresponding to said second display element, and the number of sheet films corresponding to said third display element, said display means turns on said fourth display element.

9. An X-ray radiograph apparatus according to claim 1, wherein said display means is a logarithmic scale having 10, 20, 50, and 100 graduations, said first display elements and said second display element being arranged in accordance with said 10, 20, 50, and 100 graduations.

10. An X-ray radiograph apparatus according to claim 1, wherein each of said first display elements differs from said second display element and said third display element in one of its shape, size, and color, while said second display element differs from said third display element in one of its shape, size, and color.

11. An X-ray radiograph apparatus according to claim 1, wherein said second display element is larger than each of said first display elements, while said third display element is larger than said second display element.

* * * * *